United States Patent [19]

Yamagiwa

[11] Patent Number: 5,900,088
[45] Date of Patent: May 4, 1999

[54] PROCESS FOR PRODUCING SEALANT-CONTAINED TIRE TUBE

[75] Inventor: Toshio Yamagiwa, Saitama-ken, Japan

[73] Assignee: Honda Giken Kogyo Kabushiki Kaisha, Tokyo, Japan

[21] Appl. No.: 08/875,762

[22] PCT Filed: Dec. 20, 1996

[86] PCT No.: PCT/JP96/03744

§ 371 Date: Oct. 23, 1997

§ 102(e) Date: Oct. 23, 1997

[87] PCT Pub. No.: WO97/23344

PCT Pub. Date: Mar. 7, 1997

[30] Foreign Application Priority Data

Dec. 26, 1995 [JP] Japan ................. 7-339371

[51] Int. Cl.$^6$ ......................... B29D 23/24
[52] U.S. Cl. ............... 156/115; 156/119; 156/122
[58] Field of Search .................. 156/119, 115, 156/118, 120, 121, 122; 152/506, 507, 503

[56] References Cited

U.S. PATENT DOCUMENTS

| | | | |
|---|---|---|---|
| 719,425 | 2/1903 | Blodgett | 156/115 |
| 1,427,277 | 8/1922 | Fetter | 152/506 |
| 1,689,907 | 10/1928 | Allen | 152/507 |
| 2,782,829 | 2/1957 | Peterson et al. | 152/506 |
| 4,228,839 | 10/1980 | Böhm et al. | |
| 4,388,261 | 6/1983 | Codispoti et al. | 156/115 |

FOREIGN PATENT DOCUMENTS

| | | |
|---|---|---|
| 29-2643 | 5/1954 | Japan. |
| 35-5501 | 3/1960 | Japan. |
| 54-61704 | 5/1979 | Japan. |
| 58-74342 | 5/1983 | Japan. |
| 377163 | 1/1931 | United Kingdom ........ 152/503 |

*Primary Examiner*—Geoffrey L. Knable
*Attorney, Agent, or Firm*—Nikaido, Marmelstein, Murray & Oram LLP

[57] ABSTRACT

A tube blank 2' whose inside is divided into an air chamber 3 and a sealant chamber 7 by a partition wall 5, is formed by extrusion and cut into a predetermined length. An air valve 6 is mounted to the tube blank 2' to communicate with the air chamber 3 and then, opposite ends of the tube blank is bonded by pressure bonding and vulcanized. A sealant charging bore $4_1$ is formed in the tube blank 2' to communicate with the sealant chamber 7. Thereafter, air is supplied to the air chamber 3 through the air valve 6 to urge the partition wall 5, thereby expelling the air from the sealant chamber 7. In this state, a sealant is supplied into the sealant chamber 7 through the sealant charging bore $4_1$. The sealant charging bore $4_1$ is closed by affixing a raw rubber sheet 19 and vulcanizing it.

3 Claims, 9 Drawing Sheets

FIG.2
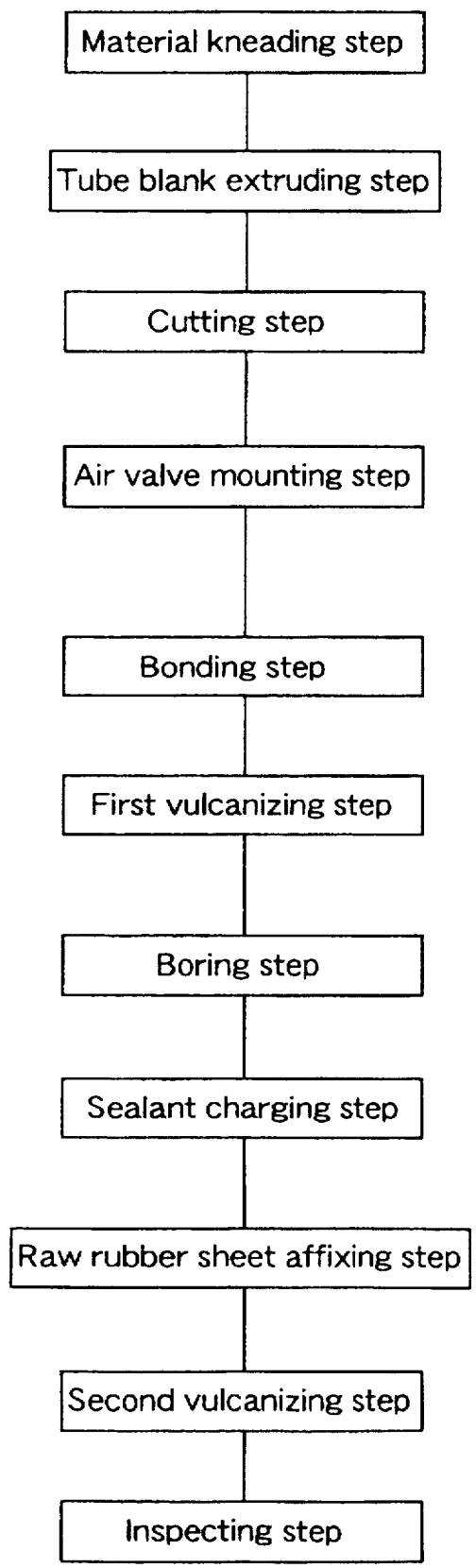
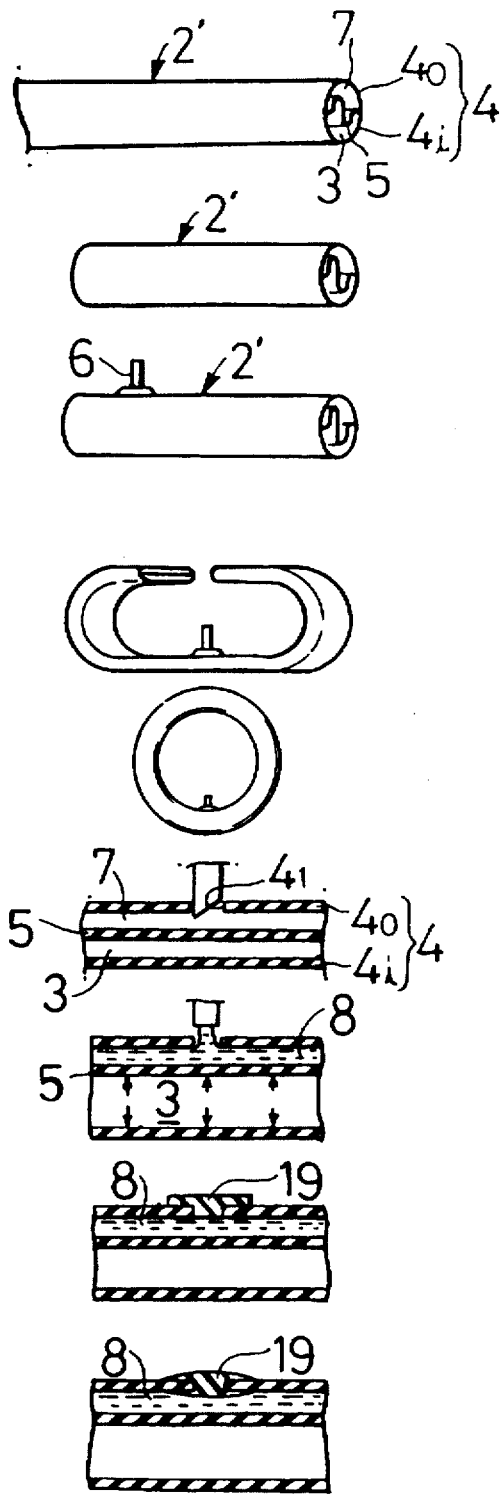

FIG.7
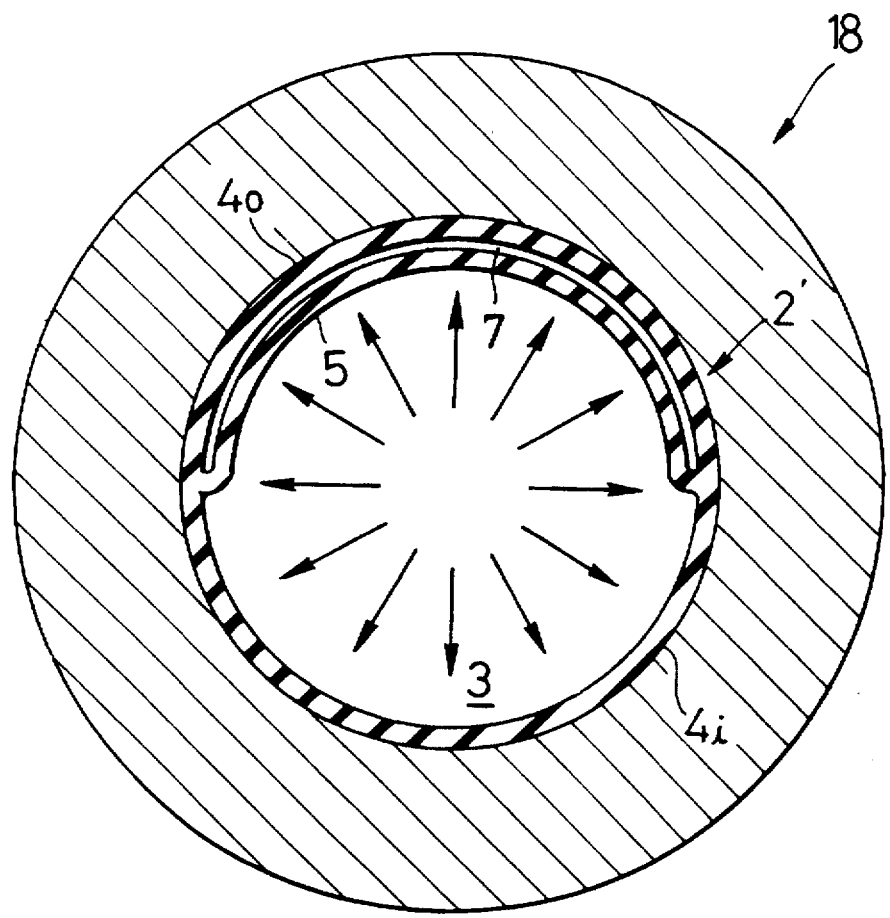
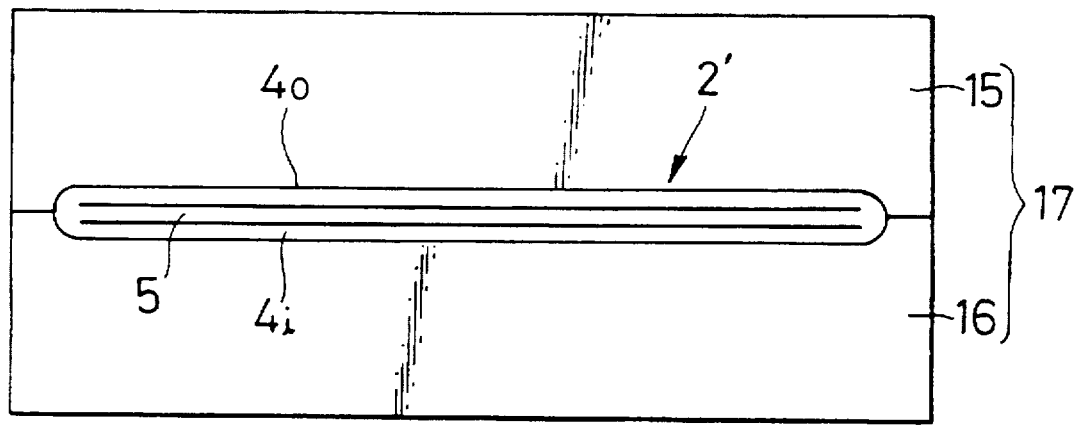

PROCESS FOR PRODUCING SEALANT-CONTAINED TIRE TUBE

FIELD OF THE INVENTION

The present invention relates to a process for producing a tire tube having a sealant contained therein and including an air chamber filled with air and a sealant chamber filled with a sealant.

BACKGROUND ART

In a usual tube-incorporated tire, if a tube gets a punctured wound caused by a nail or the like, air in the tube is leaked from the punctured wound through a small clearance between the tire and the tube and via a nipple bore in the rim to the outside and, the tire becomes flat.

Therefore, there is a conventionally known tube-incorporated tire including a liquid sealant which is previously injected in an appropriate amount for automatic emergence repairing of a puncture when the tube is punctured (see Japanese Patent Application Laid-open No. 58-74342).

In the above known tire, however, a capsule filled with the sealant is incorporated into the tube in forming the tube, and after the formation, the capsule is broken to charge the sealant into the tube. For this reason, when an external force is applied to break the capsule, not only the tube is prone to be damaged, but also the sealant may clog an air valve of the tube, and may clog a pressure gauge when an air pressure within the tube is measured.

To solve this problem, the inside of the tube may be divided into an air chamber filled with air, and a sealant chamber filled with the sealant, and the sealant may be charged directly into the sealant chamber without use of a capsule.

DISCLOSURE OF THE INVENTION

Accordingly, it is an object of the present invention to provide aprocess for efficiently producing a sealant-contained tire tube including an air chamber and a sealant chamber.

To achieve the above object, according to the present invention, there is provided a process for producing a sealant-contained tire tube including an air chamber filled with air and a sealant chamber filled with a sealant, the process comprising: a first step of extruding a tube blank including a peripheral wall of a circular section in which an air chamber and a sealant chamber are defined by a partition wall; a second step of bonding the tube blank at its opposite ends into an annular shape; a third step of forming a sealant charging bore in a peripheral wall of the tube blank to communicate with the sealant chamber; a fourth step of charging the sealant into the sealant chamber through the sealant charging bore in a state in which air has been charged into the air chamber; and a fifth the closing step of sealant charging bore formed in the peripheral wall.

With the above process, the tube blank including the air chamber and the sealant chamber defined by dividing the inside of the peripheral wall having the circular section is formed by extrusion, and the sealant is charged into the sealant chamber. Thereafter, the sealant charging bore is closed. Therefore, the air chamber and the sealant chamber can be reliably separated from each other, while preventing a damage of the tube, and the sealant can be prevented from clogging an air valve and from being leaked. In addition, since the sealant is charged into the sealant chamber through the sealant charging bore in the state in which the air has been charged into the air chamber, the air can be expelled from the sealant chamber prior to the charging of the sealant to avoid the mixing of the sealant with the air.

If the air is charged into the air chamber through an air valve mounted in the peripheral wall at the fourth step, the need for provision of a special air-charging bore in the peripheral wall can be eliminated, leading to a reduced number of fabricating steps.

If a raw rubber sheet is affixed to the sealant charging bore and vulcanized to close the sealant charging bore, the sealant charging bore can be reliably closed to prevent the leakage of the sealant.

BRIEF DESCRIPTION OF THE DRAWINGS

FIGS. 1 to 8 illustrate an embodiment of the present invention; wherein

FIG. 1 is a cross-sectional view of a wheel on which a tube-incorporated tire is mounted;

FIG. 2 shows tube-producing steps;

FIG. 3 is a cross-sectional view of a tube blank;

FIG. 4 is a partial sectional view of an extruder;

FIG. 5 is an enlarged view taken along the arrow 5;

FIG. 6 is a side view of a splicer;

FIG. 7 is an enlarged view taken along the line 7—7 in FIG. 6; and

FIG. 8 is a sectional view of a heating die.

BEST MODE FOR CARRYING OUT THE INVENTION

The present invention will now be described by way of a preferred embodiment with reference to the accompanying drawings.

Figure 1:
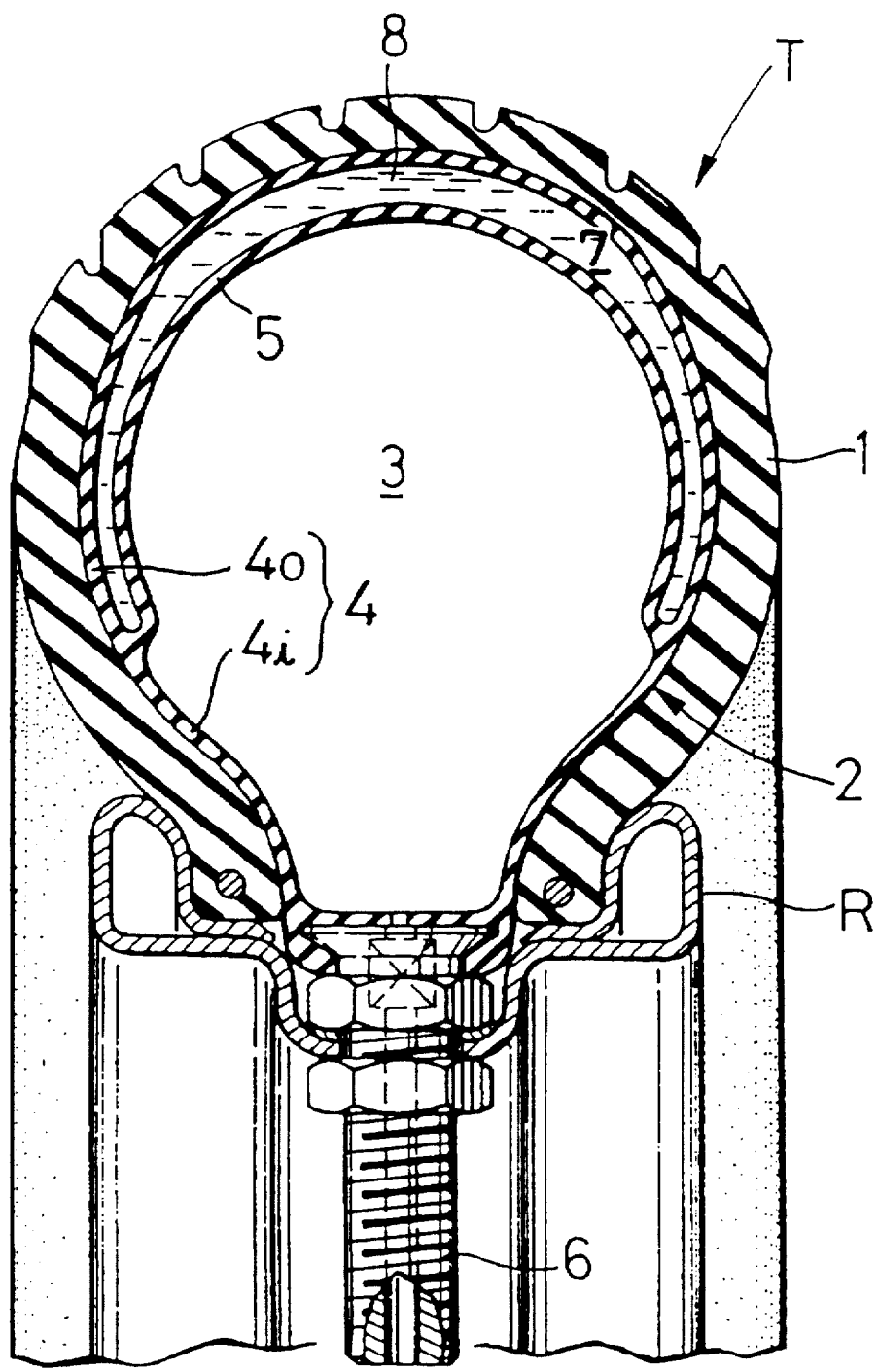

Referring to FIG. 1, a rim R of a wheel for a motorcycle is connected to a hub (not shown) through a wire spoke. A tube-incorporated tire T including a tire 1 and a tube 2 contained in the tire 1 is mounted on the rim R. The tube 2 includes a peripheral wall 4 which is formed to have an annular section and which includes an air chamber peripheral wall portion 4i located at a radially inner side and a sealant chamber peripheral wall portion 4o located at a radially outer side. A pair of connections connecting the air chamber peripheral wall portion 4i and the sealant chamber peripheral wall portion 4o of the peripheral wall 4 are connected to each other by a partition wall 5 which is formed integrally with the connections.

Air is filled in an air chamber 3 which is substantially circular in section and which is defined between the air chamber peripheral wall portion 4i and the partition wall 5. A known liquid sealant 8 is filled in a sealant chamber 7 which is substantially arcuate in section which is defined between the sealant chamber peripheral wall portion 4o and the partition wall 5. The air chamber peripheral wall portion 4i is provided with an air valve 6 for charging air into the air chamber 3.

The sealant chamber 7 in the tube 2 is maintained in a shape extending along an inner surface of the tire 1 by an air pressure in the air chamber 3. Hence, even if a centrifugal force is applied to the sealant filled in the sealant chamber 7 during rotation of the wheel, the sealant 8 can be prevented from being offset toward an outer periphery of the tube 2. Therefore, even if the tube gets a punctured wound radially or sideways by a nail or the like, the sealant 8 immediately fills the punctured wound to repair the tube 2, thereby retarding the leakage of air from the air chamber 3. The sealant 8 is retained in the sealant chamber 7 and cannot flow into the air chamber 3 and hence, the sealant 8 cannot clog the air valve 6, a pressure gauge mounted to the air valve and the like.

A process for producing the tube 2 will be described below.

As shown in FIG. 2, the process for producing the tube 2 includes a material kneading step, a tube blank extruding step, a cutting step, an air valve mounting step, a bonding step, a first vulcanizing step, a boring step, a sealant charging step, a raw rubber sheet affixing step, a second vulcanizing step and an inspecting step.

Figure 3:
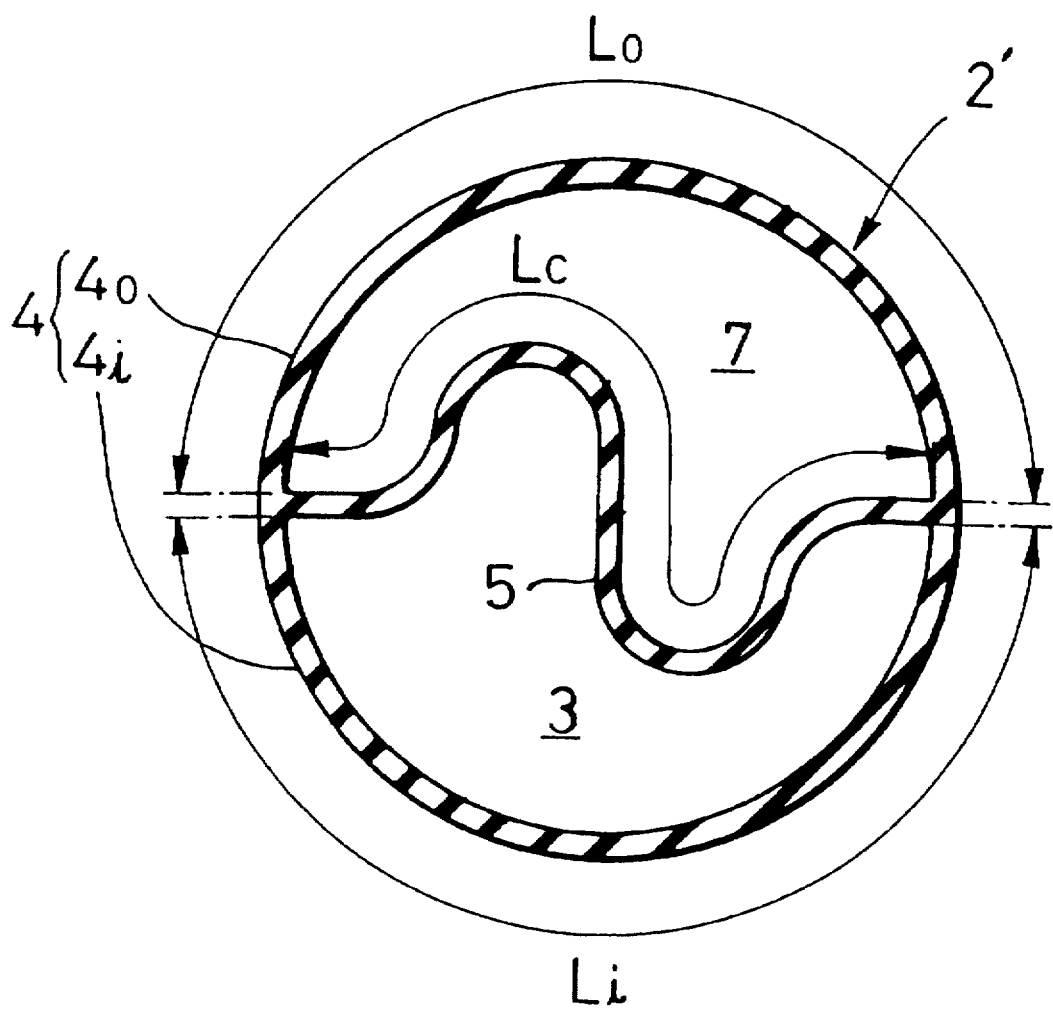
Figure 4:
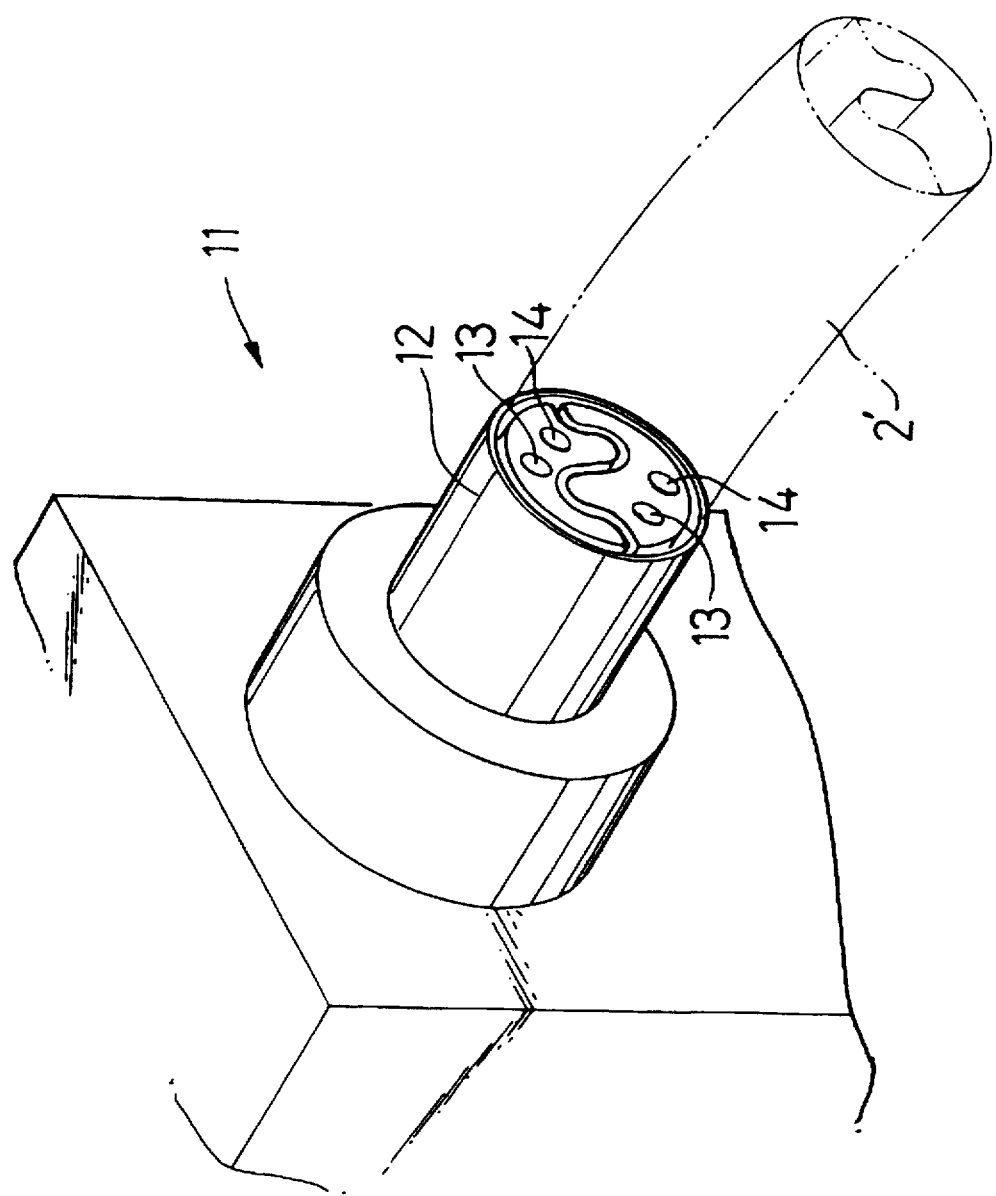
Figure 5:
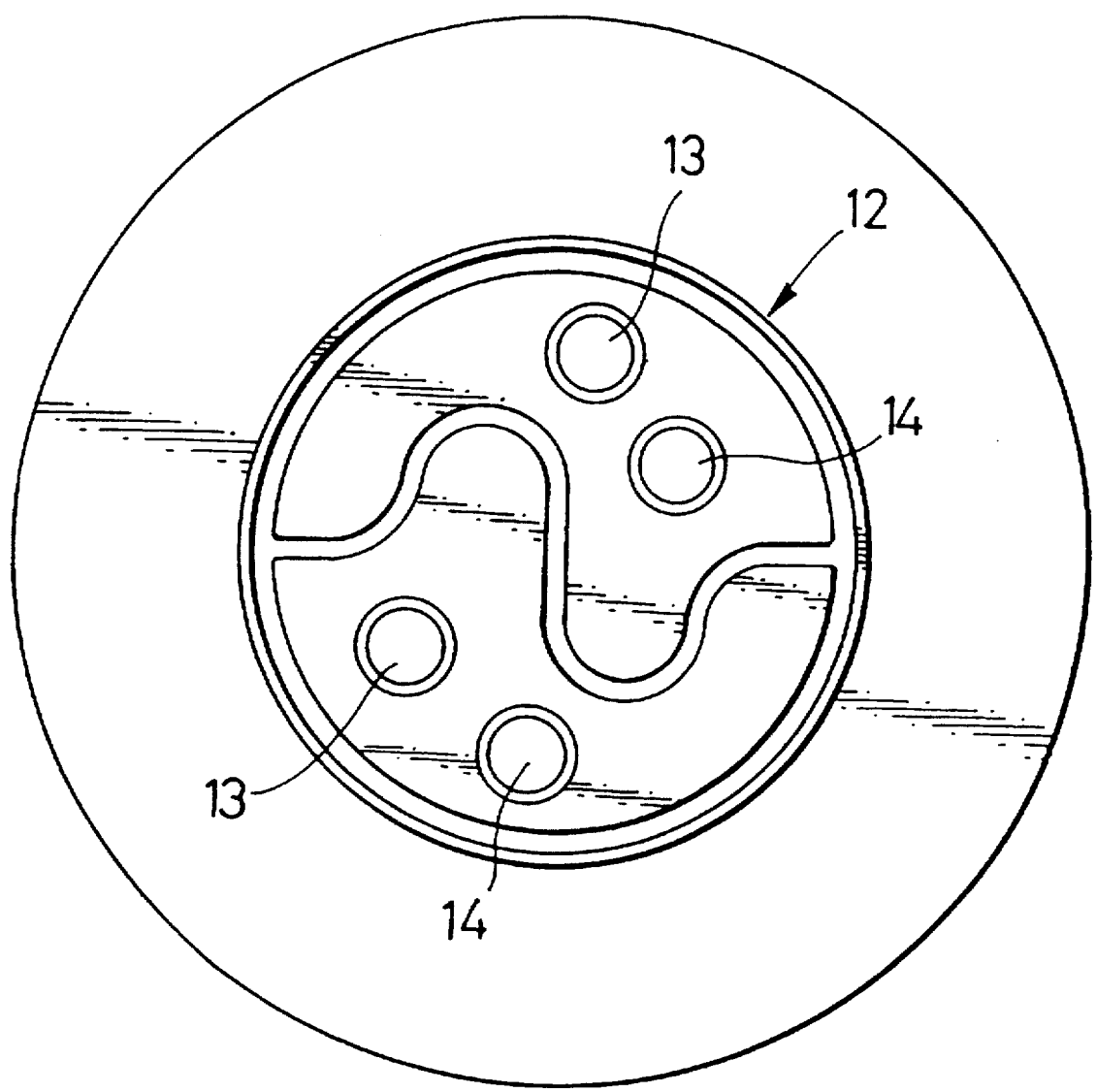

First, a material resulting from the kneading at the material kneading step is subjected to an extrusion at the tube blank extruding step, thereby forming a tube blank 2' made of a raw rubber. As shown in FIGS. 3 to 5, the tube blank 2' continuously extruded from a nozzle 12 of an extruder 11 includes a peripheral wall circular in cross section, and a partition wall 5 connecting two points of the peripheral wall 4 located on a diametrical line, in a wave-like shape. In other words, the peripheral wall 4 is divided, at a boundary provided by the connection between the peripheral wall 4 and the partition wall 5, into an air chamber peripheral wall portion 4i and a sealant chamber peripheral wall portion 4o. The length Li of the air chamber peripheral wall portion 4i, the length Lo of the sealant chamber peripheral wall portion 4o and the length Lc of the partition wall 5 are set at substantially equal values. By forming the partition wall 5 into a wave-like shape, the above length Lc can be insured without creation of a steep bent portion.

The nozzle 12 of the extruder 11 for extruding the tube blank 2' has two mold release agent discharge ports 13 and two mold release agent intake ports 14 provided therein for discharging and supplying a mold release agent such as talc from and to the air chamber 3 and the sealant chamber 7. By forming the air chamber 3 and the sealant chamber 7 into the same sectional area by the partition wall 5 having the wave-like cross section, a space for disposition of the mold release agent discharge ports 13 and the mold release agent intake ports 14 can be easily insured.

At the subsequent cutting step, the tube blank 2' is cut into a predetermined length and then, at the air valve mounting step, the air valve 6 is mounted at place to the air chamber peripheral wall 4i. Further, at bonding step, the opposite ends of the tube blank 2' are bonded.

Figure 6:
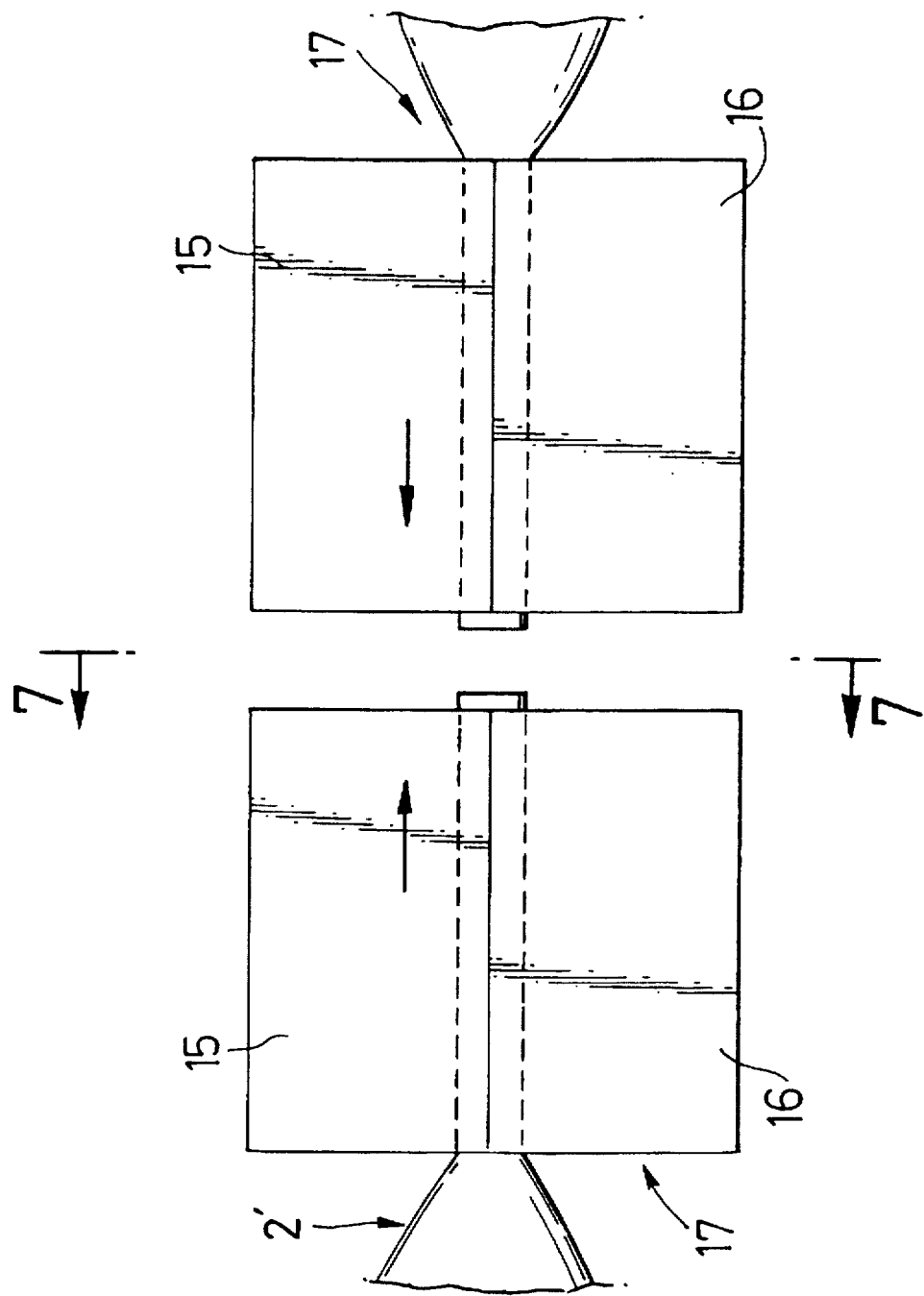
Figure 7:
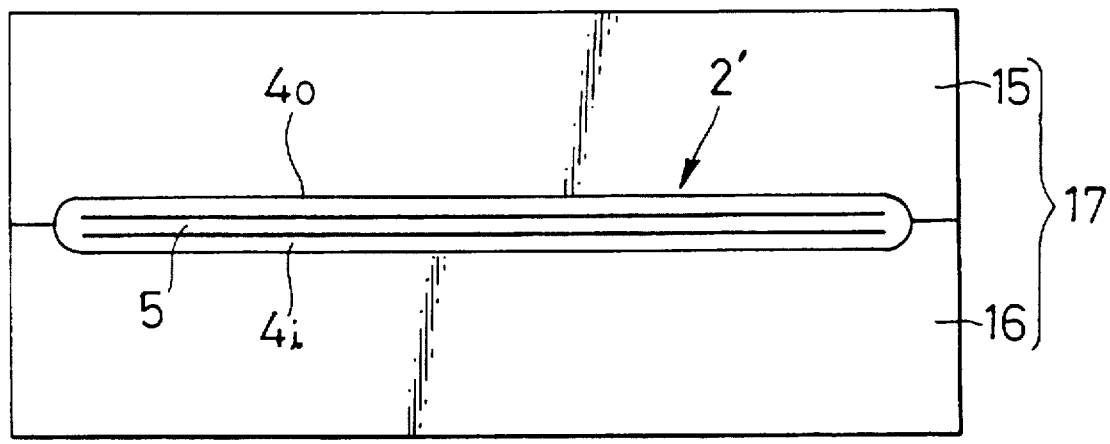

FIGS. 6 and 7 show a splicer used at the bonding step. The opposite ends of the tube blank 2' are clamped by a clamp 17 comprised of a pair of clamp members 15 and 16, so that the opposite ends of the tube blank 2' slightly protruding from the clamp members 15 and 16 are pressure-bonded to each other. The tube blank 2' made of the raw rubber before being vulcanized is bonded into an annular shape by the pressure bonding.

At this time, in order to correctly bond the air chamber peripheral wall portion 4i, the partition wall 5 and the sealant chamber peripheral wall portion 4o at one end of the tube blank 2' to the air chamber peripheral wall portion 4i, the partition wall 5 and the sealant chamber peripheral wall portion 4o at the other end of the tube blank 2', the partition wall 5 is sandwiched between the air chamber peripheral wall portion 4i and the sealant chamber peripheral wall portion 4o and clamped by the cramp 17 to form three layers (see FIG. 7). Because all of the length Li of the air chamber peripheral wall portion 4i, the length Lc of the partition wall 5 and the length Lo of the sealant chamber peripheral wall portion 4o are set equally (see FIG. 3), as described above, the air chamber peripheral wall portion 4i, the partition wall 5 and the sealant chamber peripheral wall portion 4o are clamped as being of natural lengths, without being compressed or expanded. Thus, the air chamber peripheral wall portion 4i, the partition wall 5 and the sealant chamber peripheral wall portion 4o are prevented from being wrinkled, and can be reliably bonded together.

Figure 8:
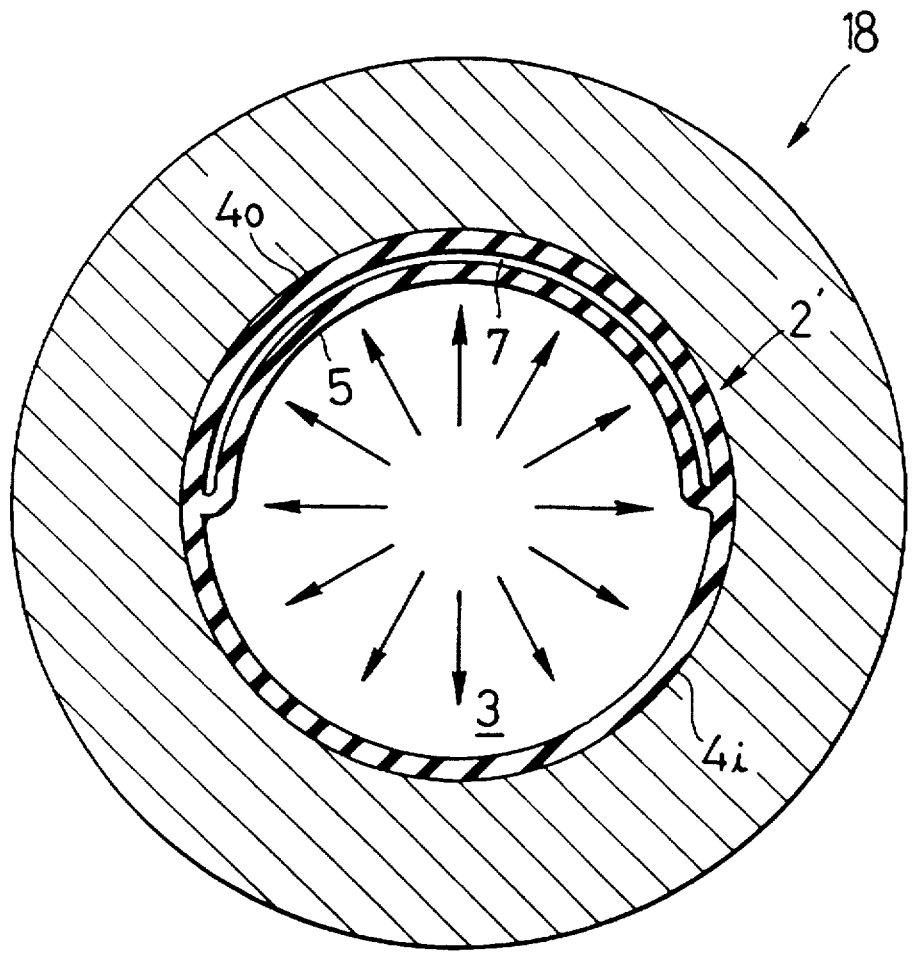

At the next first vulcanizing step, as shown in FIG. 8, the tube blank 2' is placed into a heating die 18, and the air chamber peripheral wall portion 4i and the sealant chamber peripheral wall portion 4o are brought into close contact with the heating die 18 and at the same time, the partition wall 5 is brought into close contact with the sealant chamber peripheral wall portion 4o by supplying heated air and hot steam into the air chamber 3 through the air valve 6. In this state, the heating die 18 is heated to conduct the vulcanization.

At the subsequent boring step, the sealant chamber peripheral wall portion 4o of the tube blank 2' is formed with a sealant charging bore $4_1$ and then, at the sealant charging step, the sealant 8 is charged through the sealant charging bore $4_1$ into the sealant chamber 7. In this case, air is supplied through the air valve 6 into the air chamber 3 to expand the air chamber 3 prior to the charging of the sealant 8, thereby causing the partition wall 5 to be brought into close contact with the sealant peripheral wall portion 4o as in the state shown in FIG. 8 to completely discharge the air within the sealant chamber. In this state, the charging of the sealant 8 is started. In this manner, by starting the charging of the sealant 8 in the state in which the air in the sealant chamber 7 has been completely discharged, the incorporation of the air into the sealant 8 can be reliably prevented, and only the sealant 8 can be charged. In addition, since the air is supplied into the air chamber 3 by utilizing the air valve 6, it is unnecessary to open a bore used for charging the air.

Then, at the raw rubber sheet affixing step, a raw rubber sheet 19 is affixed to cover the sealant charging bore $4_1$ and then, a portion of the tube blank 2' in the vicinity of the raw rubber sheet 19 is locally vulcanized at the second vulcanizing step to close the sealant charging bore $4_1$, thereby finishing a tube 2. Because the sealant charging bore $4_1$ is closed using the raw rubber sheet 19 which is the same material as for the tube blank 2', the strength of the closed portion can be enhanced to reliably prevent the leakage of the sealant 8. The finished tube 2 is then inspected at the inspecting step to complete the producing process.

Although the embodiment of the present invention has been described in detail, it will be understood that the present invention is not limited to the above-described embodiment, and various modifications may be made without departing from the subject matter and scope of the invention defined claims.

Figure 9A:
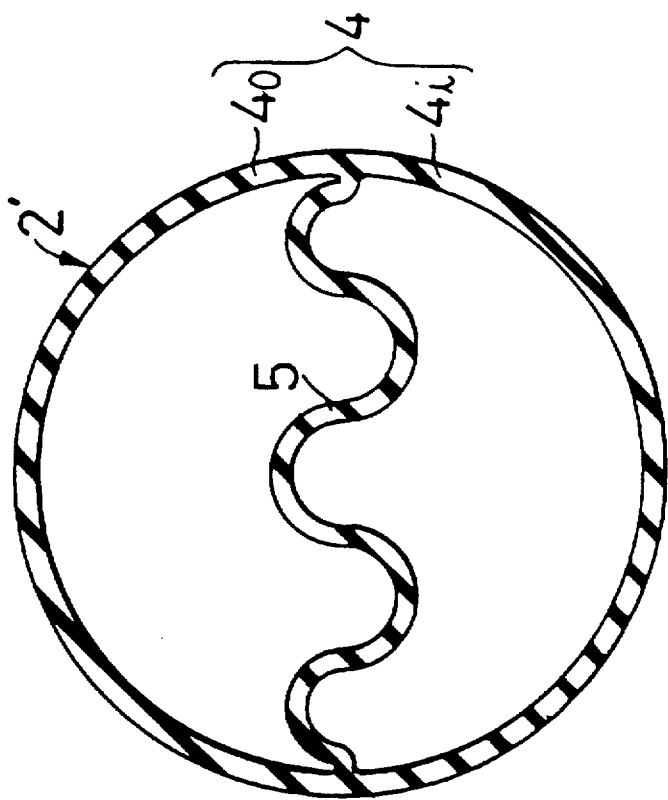
FIGS. 9A and 9B show alternative embodiments of the partition wall in the tube made by the process of the present invention.
Figure 9B:
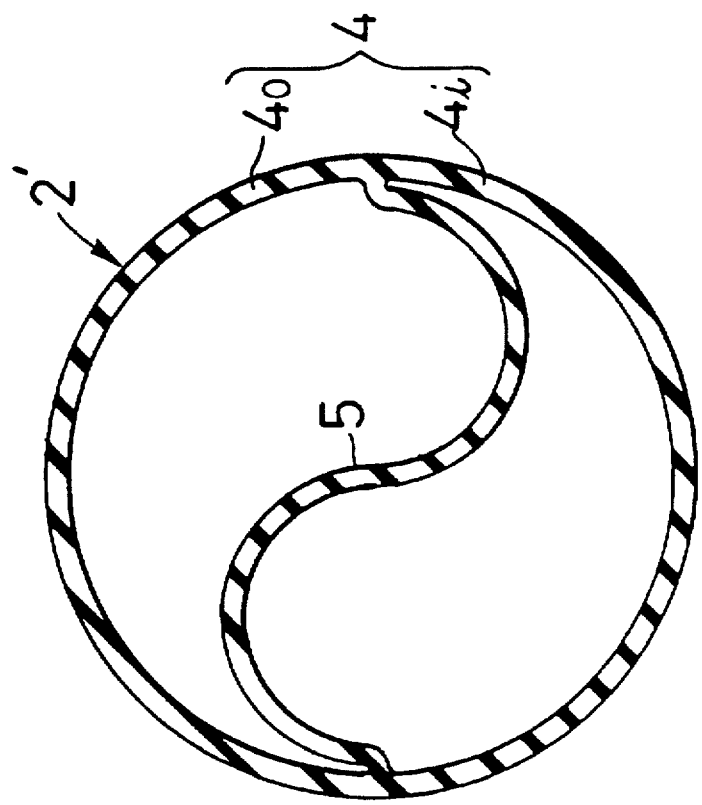

For example, the shape of the partition wall 5 in forming the tube blank 2' by extrusion is not limited to the wave-like shape in the embodiment and may be other wave-like shapes as shown in FIGS. 9A and 9B.

What is claimed is:

1. A process for producing a sealant-contained tire tube including an air chamber filled with air and a sealant chamber filled with sealant, said process comprising:

a first step of extruding a tube blank including a peripheral wall of a circular section in which an air chamber and a sealant chamber are defined by a partition wall;

a second step of bonding said tube blank at its opposite ends into an annular shape;

a third step of forming a sealant charging bore in said peripheral wall to communicate with said sealant chamber;

a fourth step of charging the sealant into said sealant chamber through said sealant charging bore in a state in which air has been charged into said air chamber to bring the partition wall into close contact with the peripheral wall and thereby completely discharge the air within the sealant chamber; and a fifth step of closing said sealant charging bore formed in said peripheral wall.

2. A process for producing a sealant-contained tire tube according to claim 1, wherein the air is charged, at said fourth step, into said air chamber through an air valve mounted in said peripheral wall.

3. A process for producing a sealant-contained tire tube according to claim 1, wherein a raw rubber sheet is affixed to said sealant charging bore and vulcanized to close said sealant charging bore.

* * * * *